United States Patent
Fricker

[15] 3,657,620
[45] Apr. 18, 1972

[54] SOLID STATE MOTOR START SWITCH
[72] Inventor: David C. Fricker, Hurst, Tex.
[73] Assignee: ECC Corporation, Euless, Tex.
[22] Filed: Mar. 12, 1971
[21] Appl. No.: 123,734
[52] U.S. Cl. .................................. 318/221 E, 318/227
[51] Int. Cl. ........................................... H02p 1/44
[58] Field of Search ............ 318/220 R, 221 R, 221 E, 227, 318/474, 476

[56] References Cited
UNITED STATES PATENTS
3,376,484   4/1968   Lewus .................. 318/221 E
3,414,789  12/1968   Prouty .................. 318/221 E
3,544,869  12/1970   Plouffe et al. .......... 318/221 R Primary Examiner—Gene Z. Rubinson
Attorney—Giles C. Clegg, Jr., Richard E. Bee and Jack A. Kanz

[57] ABSTRACT

An electronic switch circuit for controlling the start operation of a single phase induction motor in accordance with the speed of the motor.

9 Claims, 12 Drawing Figures

INVENTOR
DAVID C. FRICKER

ATTORNEYS

SOLID STATE MOTOR START SWITCH

BACKGROUND OF THE INVENTION

The present invention relates to switching circuits and, more particularly, to a switching circuit especially adapted for use in the starting circuit of a single phase induction motor.

Single phase induction motors and the operation thereof are well known in the art. Such motors are generally classified in accordance with and identified by the method of starting. For example, typical motors are referred to as split phase or capacitor start-capacitor run or capacitor start-induction run. Typically, appropriate line voltage is applied across the run winding of a single phase induction motor and a branch circuit containing a starting reactance is utilized to produce starting torque. After the motor has been started and a suitable operating condition is achieved, the branch circuit is effectively removed (i.e., electrically disconnected) from the circuit. Thereafter, the motor continues to run with the force provided by the run winding.

In most prior art devices, the starting reactance is disconnected from the circuit by means of a mechanical switch conventionally operated by centrifugal force or by a current operated relay. Each of these disconnect methods are characterized by inherent difficulties relating to size, reliability and operational tolerance.

More recently, solid state switching circuits have been proposed for use as starting switches. In certain ones of these solid state switching circuits, operation of the switch is controlled as a function of time. In others, different motor parameters, such as the amount of current flowing through the run winding, is used to control the switching circuits to disconnect the starting reactance after the motor has attained the predetermined speed. Generally, it is preferred that the starting reactance be disconnected after the motor has attained a desired speed rather than depending upon a predetermined time delay. The sensing of the desired speed, without adversely effecting the motor characteristics, has proved difficult.

SUMMARY OF THE INVENTION

The present invention provides an electronic switching circuit especially adaptable for use in disconnecting the starting reactance of a single phase induction motor after starting is accomplished, as indicated by the motor attaining a desired speed. A measure of the motor speed is obtained by sensing the amount of current flowing through the run winding. The solid state switching circuit of the present invention has been found to be small, extremely reliable, and competitive in cost with the older mechanical switches.

In accordance with the present invention, a bilateral AC switching device is connected by its power electrodes in series with the starting reactance. When the switching device is in its normal high impedance state, the starting reactance is effectively disconnected. When the device is switched to its quasi stable low impedance state by control signals applied thereto, the starting reactance is connected to the source of supply voltage for assisting in starting of the motor. There is also provided supply means responsive to the amplitude of current flowing through the run winding of the motor for supplying gating current to the control electrode of a second bilateral AC switching device. The supply means comprises, for example, a resistor connected in series with the run winding. The power electrodes of the second switching device are connected to supply gating current to the control electrode of the first switching device and the supply means supplies gating current to the control electrode of the second switching device. As the current flowing through the run winding varies inversely with the motor speed, the size of resistor is chosen such that when the speed of the motor is at or above a predetermined operation speed, control signals sufficient to trigger the second bilateral switch to a low impedance state will not be provided by the supply means. In accordance with the present invention, the second AC switching device is required to conduct through its power electrodes only sufficient current to switch the first AC switching device to the low impedance state, and accordingly can be quite small and extremely sensitive to gate current. The resistor connected in series with the run winding can, therefore, be characterized by a very low resistance, comparable to the control winding resistance of mechanical relays used in starting switches.

Many objects and advantages of the invention will become apparent to those skilled in the art as a detailed description of the invention unfolds in conjunction with the appended drawings wherein like reference numerals denote like parts and in which.

Figure 1:
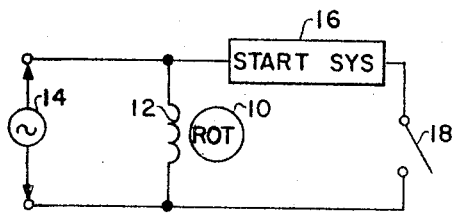
FIG. 1 is a schematic diagram of a typical single phase AC motor with a starting system.

A typical single phase alternating-current motor is shown in FIG. 1 of the drawings which comprises a rotor 10 and a run winding 12 with the run winding being connected across a source 14 of alternating-current supply voltage. To facilitate starting of the motor, a start system 16 is connected in shunt with the run winding 12 through a motor start switch 18. The type of start system used commonly determines the designation applied to the motor such as capacitor start, capacitor run, capacitor start-inductor-run, split phase, etc. In order to start the motor, switch 18 is closed, permitting current to flow through the start system from the source of supply voltage and thus providing a starting torque for the motor. Upon occurrence of a predetermined condition, such as the rotor 10 attaining a desired speed, the switch 18 is caused to open and the driving force for the motor results from the interaction between the magnetic fields of the rotor 10 and the run winding 12.

The start switch 18 is conventionally caused to open either a predetermined time interval after its closure or upon the rotor 10 attaining a predetermined speed.

Centrifugally operated mechanical switches are most often used when the start switch 18 is to be responsive to motor speed. However, some attempts have been made to substitute semiconductor solid state switching devices for the mechanical switches in view of their generally increased reliability of switching and long life in terms of number of switching operations which can be expected without failure. However, the switching circuits used have not achieved wide spread acceptance in view of cost considerations and lack of a satisfactory circuit for generating a control signal at desired times to control the solid state switching device.

Figure 2:
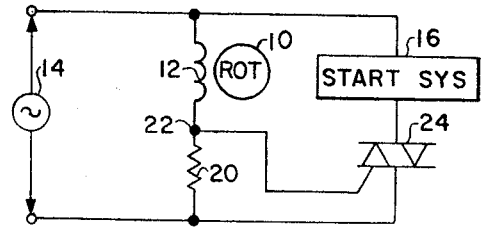
FIG. 2 is a schematic diagram illustrating a prior art solid state motor start switch.

An exemplary solid state motor start switch which can be manufactured at a satisfactorily low cost is that shown in FIG. 2 of the drawings wherein the run winding 12 is connected across the source 14 of AC supply voltage through a resistor 20. The juncture 22 between the winding 12 and the resistor 20 is connected to the control electrode or gate electrode of a semiconductor solid state bilateral alternating-current switching device 24 of a type well known in the art. The power electrodes of the switching device 24 are connected in series with the starting system 16 across the source 14 of AC supply voltage. It will be readily apparent that the switching device 24 replaces the mechanical switch 18 of FIG. 1 of the drawings.

In operation of the circuit of FIG. 2, a control signal is supplied to the gate electrode of the device 24 to cause the device 24 to switch to the quasi stable low impedance state from its normal high impedance state when the current through the run winding 12 is equal to or in excess of a predetermined level. The predetermined level of current flow will, of course, vary dependant upon the characteristics of the device 24 and the resistance of resistor 20. However, when power is initially supplied to the motor, current through the winding will be in excess of a predetermined level causing the device 24 to be switched to its low impedance state and after the motor has attained a desired speed the current through the run winding 12 will have decreased to a level below the predetermined level, causing the switch 24 not to be switched to its low impedance state until the current through the motor increases to the predetermined level responsive to decrease in speed of the motor produced, for example, by an increase in load.

The circuit of FIG. 2 is subject to three principal disadvantages. The first of these disadvantages is related to economy of operation and results in the fact that a substantial potential must be produced across the resistor 20 in order to produce sufficient gate drive to cause the device 24 to switch to its low impedance state. The power dissipated in the resistor 20 is, of course, wasted and produces no useful result after the motor start cycle is completed. The second major disadvantage is that the switching of device 24 in opposite directions is generally not perfectly symmetrical. Even through the devices used are screened quite closely, there will be a difference in conduction times during opposite half cycles with a constant amount of gate drive, resulting in a DC component in the current flowing through the start winding. The third disadvantage is related to the first two in that in order to obtain devices which will switch to the low impedance state with the minimum gate drive, minimizing the power loss in the run winding circuit, and to obtain devices with as nearly symmetrical switching characteristics as possible, minimizing the DC component produced in the start winding, it is necessary to carefully select and screen the devices 24 used. In practice, it has been found that only about 5 per cent of the switching devices produced in a typical production run are suitable for use in such a circuit, increasing the cost of such circuits and rendering them non-competitive with the older, centrifugal mechanical switches.

Figure 3:
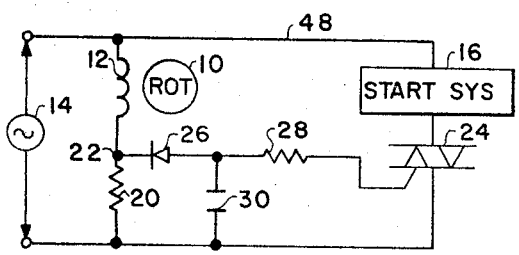
FIG. 3 is a schematic diagram illustrating an improvement on the circuit of FIG. 2.

FIG. 3 of the drawings shows a modification of the circuit of FIG. 2 which was used in an attempt to overcome certain of the disadvantages of the circuit of FIG. 2. Thus, in the circuit of FIG. 3 a juncture 22 is connected through a diode 26 and a resistor 28 to the gate electrode of the bilateral AC switch 24, with a juncture between the diode 26 and resistor 28 being connected through a capacitor 30 to one side of the source 14. In the circuit of FIG. 3, the potential appearing across the resistor 20 is rectified and used to charge a filtering capacitor 30 providing a source of unidirectional gate current for the device 24. The device 24 is, therefore, caused to switch to the low impedance state during the second and third switching quadrants. Though circuit performance may be somewhat improved, there remains a necessity to screen the devices 24 used in the circuit and an excessive amount of power is dissipated in resistor 20.

Figure 4:
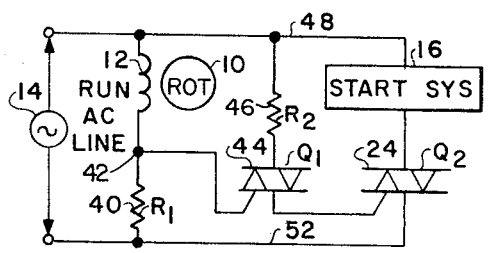
FIG. 4 is a schematic diagram illustrating one embodiment of the present invention.

One embodiment of a solid state motor start circuit in accordance with the present invention is shown in FIG. 4 of the drawings. It can be seen that the circuit in FIG. 4 is similar in some respects to that of FIG. 2 in that there is provided a resistor 40 connected in series with the run winding 12 across the source 14 of AC supply voltage and a bilateral AC switching device 24 is connected in series with the starting system 16 across the source 14. However, in accordance with the principles of the present invention, the resistor 40 can be an order of magnitude or less smaller than the resistor 20 of FIG. 2, greatly decreasing the amount of power dissipated in the resistor. In accordance with the principles of the present invention, the juncture 42 between winding 12 and resistor 40 is connected to the control electrode or gate electrode of a second bilateral AC switching device 44. The power electrodes of the second switching device 44 are connected to supply gating current to the control electrode of the first switching device 24 whenever the second device 44 is switched to the low impedance state.

For sake of convenience in distinguishing between the two power electrodes of either one of the switching devices 24 and 44, the upper power electrode will be referred to as the anode while the lower power electrode (the one on the same side as the gate electrode) will be referred to as the cathode. This terminology is, of course, somewhat inaccurate for the case of a bilateral device because such device is about as capable of conducting current in one direction as it is in the other. Nevertheless, such terminology will be used for sake of convenience.

In accordance with the specific embodiment of the invention shown in FIG. 4 of the drawings, the lower or cathode power electrode of device 44 is connected directly to the gate electrode of device 24 and the upper or anode power electrode of device 44 is connected through resistor 46 to line 48 which connects to the source 14 of the supply voltage. The device 44 is required to conduct sufficient current only to drive the device 24 and, accordingly, can be made of much smaller size and current rating. The reduced size of device 44 renders it feasible for it to be made sensitive to much lower levels of gate current, suitably in the order of 1 to 3 milliamperes. The increased gate sensitivity of the device 44 promotes greatly increased symmetry and switching action. It also means that the resistor 40 can be of smaller value, thus reducing the power dissipation. Accordingly, by providing the smaller bilateral AC switch 44 which is controlled by the potential appearing across resistor 40 and using the smaller AC switch 44 to control the power AC switch 24, the disadvantages inherent in the circuits of FIGS. 2 and 3 are reduced or eliminated.

More particularly, the additional cost of the device 44 is more than offset by the lack of necessity to screen the device 24 to be used, making the cost of the control circuit of FIG. 4 less than that of centrifugal, mechanical switches which perform a like function. The reduction in the size of resistor 40 as compared to resistor 20 is sufficient that power dissipated in resistor 40 is not of concern. Symmetry of switching in the different quadrants of the device 44, compared to the device 24, is much improved, virtually eliminating any DC component of current flowing through the starting system 16.

A problem inherent in each of the circuits shown in FIGS. 2, 3 and 4 is that the device 24 will not be rendered conductive at the zero crossing point of each half cycle in which the device is to be switched to the low impedance state, but rather a nonconductive notch appears which is defined by the interval between the beginning of the half cycle and the instant at which the device 24 is rendered conductive. The presence of this notch results in a decrease in the effective power supplied to the starting system, reducing the torque applied to the motor. In accordance with a modification of the circuit of FIG. 4 shown in FIG. 5 of the drawings, the juncture 42 is connected to the gate electrode of the device 44 through a capacitor 50. It is important to note that capacitor 50, the gate-to-cathode circuit of device 44 and the gate-to-cathode circuit of device 24 are connected in series between the juncture 42 and a line 52 across the resistor 40. It is important to note also that due to the inductive nature of the winding 12, the voltage appearing across resistor 40 of FIGS. 4 and 5 or resistor 20 of FIGS. 2 and 3 will lag the applied supply voltage, increasing the notch effect. However, provision of the capacitor 50 causes the potential appearing between the gate and cathode electrodes of the devices 44 and 24 to lead the voltage appearing across resistor 40, reducing the width of the non-conductive notch.

Figure 5:
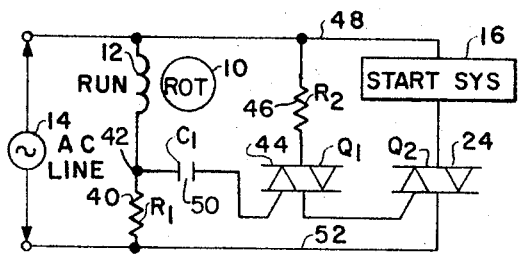
FIG. 5 is a schematic diagram illustrating an improved modification of the circuit of FIG. 4.
Figure 6:
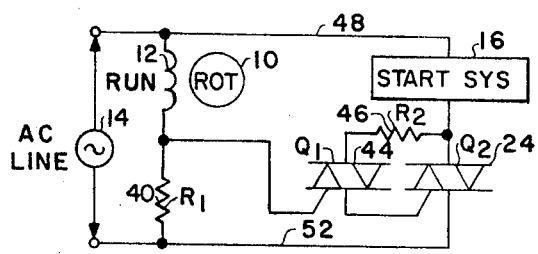
FIGS. 6 and 7 are schematic diagrams similar to FIGS. 4 and 5 illustrating a second embodiment of the invention.
Figure 7:
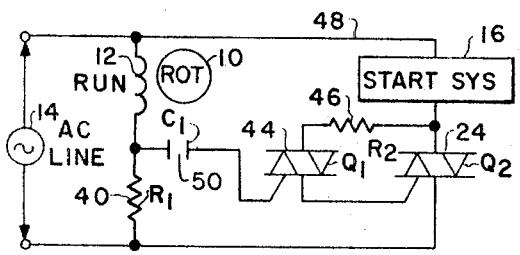

A slight modification of the circuit shown in FIGS. 4 and 5 of the drawings is shown in FIGS. 6 and 7 of the drawings wherein resistor 46 is connected directly to the anode of device 24 rather than to line 48. An important advantage of the circuits of FIGS. 6 and 7 over the circuits of FIGS. 4 and 5 is that when the device 24 is switched to its low impedance state, the potential appearing across the series circuit formed by device 44 and resistor 46 will be extremely small, substantially reducing the power dissipated in the switching circuit.

Figure 8:
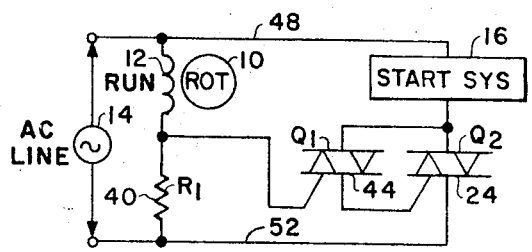
FIGS. 8 and 9 are schematic diagrams similar to FIGS. 4 and 5 illustrating a third embodiment of the present invention.
Figure 9:
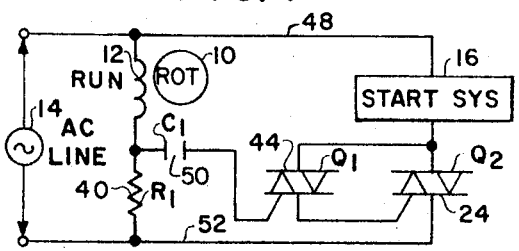

As shown in FIGS. 8 and 9 of the drawings, it is practical in many instances to dispense with the resistor 46, as the switching characteristics of the device 24 is such that the device is switched from the high impedance state to the low impedance state in such an extremely short period of time that current surges through the device 44 are practically non-existent. This is particularly true when the start system 16 includes an inductive member. Elimination of the resistor 46 provides a small but significant cost consideration.

Figure 10:
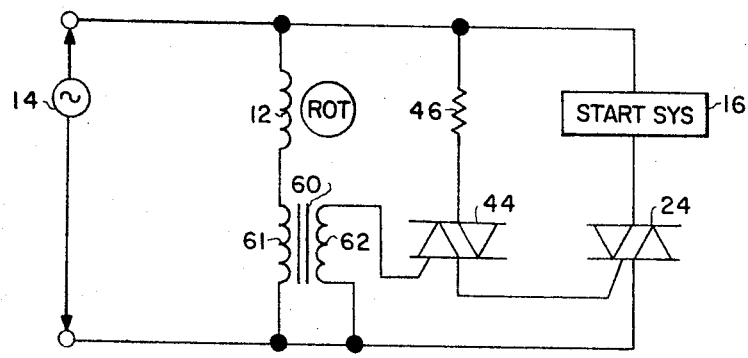
FIGS. 10 and 11 are schematic diagrams similar to FIGS. 4 and 5 and illustrating a fourth embodiment of the present invention.
Figure 11:
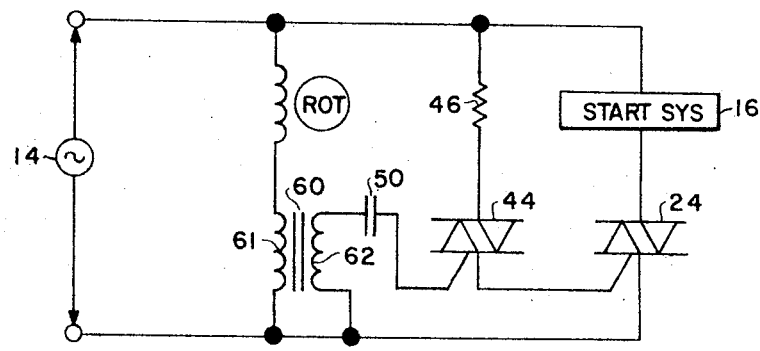

Referring to FIGS. 10 and 11, there is shown a further modification of the circuits of FIGS. 4 and 5. As indicated by FIGS. 10 and 11, the resistor 40 may be replaced by a current transformer 60. The first or primary winding 61 of current transformer 60 is connected in series with the motor run winding 12, while the second or secondary winding 62 of current transformer 60 is connected in series in the gate electrode circuit of the switching device 44. In FIG. 11, the connection to the gate electrode is by way of the capacitor 50. In either FIGURE, the current transformer 60 is constructed to provide a very, very low impedance in series with the motor run winding 12.

The use of a current transformer 60 enables a reduction of the notch effect caused by the phase lag of the voltage across resistor 40. For example, by proper selection of the polarity of secondary winding 62 in FIG. 10, a phase shift of 180° is added to the 90° phase lag of the run winding current. This causes the secondary winding voltage to assume a leading phase angle of 90°, hence insuring that the gating current to switching device 44 will be of sufficient magnitude at the zero crossing point of the line voltage to cause conduction in the device 44 with a minimum of notch effect. The use of a current transformer 60 also provides even less resistance in series with the motor run winding 12 than does the resistor 40. Thus, the power dissipation is further reduced. On the other hand, a current transformer will normally cost somewhat more than a resistor. Consequently, the current transformer embodiments can be used to best advantage with higher horsepower motors where the saving in power loss will in many cases offset the added cost of the current transformer.

A current transformer 60 can also be used in place of the resistor 40 of any of the embodiments of FIGS. 6-9.

Figure 12:
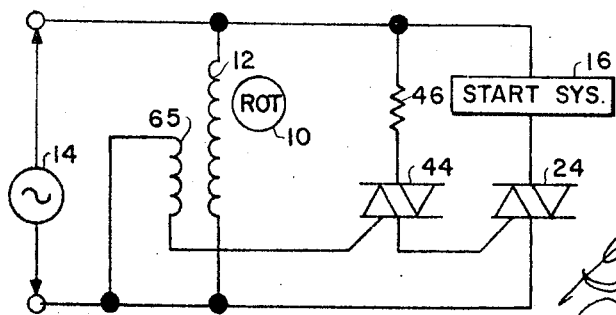
FIG. 12 is a schematic diagram showing a further embodiment of the invention.

FIG. 12 shows the use of a modified form of current transformer. In particular, the primary winding of the current transformer is omitted and the secondary winding, which is represented in FIG. 12 by winding 65, is placed in close physical proximity to the motor run winding 12 so as to be inductively coupled thereto. For example, the winding 65 may be wound along side of some of turns of run winding 12 and located therewith inside the motor housing. As before, one side of the secondary or output winding 65 is connected to the gate electrode of device 44, while the other side of winding 65 is connected to the lower line running to the AC source 14.

Although the invention has been described with reference to particular preferred embodiments thereof, many changes and modifications will become apparent to those skilled in the art in view of the foregoing description which is intended to be illustrative and not limiting of the inventions defined in the claims.

What is claimed is:
1. A speed responsive motor start system comprising:
   a. a motor including a run winding and a starting system;
   b. first and second bilateral switching devices, each having a pair of power electrodes and a control electrode;
   c. means connecting said first switching device by its power electrodes in series with said starting system;
   d. means connecting the second switching device by its power electrodes to supply gating current to the control electrode of the first switching device; and
   e. supply means responsive to the current flowing through the run winding for supplying gating current to the control electrode of the second switching device.

2. A system as defined in claim 1 wherein said supply means comprises a resistor connected in series with said run winding and means coupling the control electrode circuit of the second switching device across said resistor to switch said second switching device to the low impedance state when the current through the run winding is above a predetermined level.

3. A system as defined in claim 2 wherein said supply means further includes a capacitor connected between said resistor and said control electrode for causing the potential at the control electrode to lead the potential across the resistor.

4. A system as defined in claim 1 wherein said supply means comprises transformer means responsive to the current flowing through the run winding and having an output winding connected in the control electrode circuit of the second switching device.

5. A system as defined in claim 1 wherein said supply means comprises a current transformer having a first winding connected in series with the run winding and a second winding connected in the control electrode circuit of the second switching device.

6. A system as defined in claim 5 wherein one side of the second transformer winding is connected to the control electrode of the second switching device by a capacitor.

7. A system as defined in claim 1 wherein the power electrodes of the second device are connected across the gate-anode circuit of the first switching device.

8. A system as defined in claim 7 wherein the power electrodes of the second device are connected by a low resistance path directly across the gate-anode electrodes of the first device.

9. A system as defined in claim 1 wherein the second device is characterized by a greater sensitivity to gate current than the first device.

* * * * *